US012449763B2

(12) United States Patent
Nakatsu (10) Patent No.: US 12,449,763 B2
(45) Date of Patent: Oct. 21, 2025

(54) IMAGE FORMING APPARATUS (71) Applicant: CANON KABUSHIKI KAISHA, Tokyo (JP)

(72) Inventor: Haruhiko Nakatsu, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/470,547

(22) Filed: Sep. 20, 2023

(65) Prior Publication Data

US 2024/0103436 A1 Mar. 28, 2024

(30) Foreign Application Priority Data

Sep. 28, 2022 (JP) ................. 2022-154584

(51) Int. Cl.
G03G 21/20 (2006.01)
G03G 21/16 (2006.01)
H04N 1/00 (2006.01)

(52) U.S. Cl.
CPC ....... *G03G 21/206* (2013.01); *G03G 21/1619* (2013.01); *H04N 1/00549* (2013.01); *H04N 1/00559* (2013.01); *H04N 1/00981* (2013.01)

(58) Field of Classification Search
CPC ......... G03G 21/206; G03G 2221/1645; G03G 15/2017; G03G 21/0052
See application file for complete search history.

(56) References Cited

U.S. PATENT DOCUMENTS

| | | | |
|---|---|---|---|
| 2018/0059585 A1* | 3/2018 | Kuroda | G03G 21/206 |
| 2020/0201239 A1* | 6/2020 | Kawasumi | G03G 21/0052 |
| 2020/0326654 A1* | 10/2020 | Mizutani | G03G 21/10 |
| 2022/0187763 A1* | 6/2022 | Nojima | G03G 15/657 |

FOREIGN PATENT DOCUMENTS

JP           H09270975 A      10/1997

* cited by examiner

Primary Examiner — Jessica L Eley
(74) Attorney, Agent, or Firm — ROSSI, KIMMS & McDOWELL LLP (57) ABSTRACT An image forming apparatus includes a frame configured to support a process member configured to execute part of an image formation process on a recording material, a fan placed on a placement surface of the frame so as to be relatively movable with respect to the frame, a duct fixed to the frame and having a communication port communicating with an air intake port or an air outlet port of the fan, a restriction portion configured to restrict a movable range of the fan, and an elastic member disposed to be nipped by the duct and the fan.

11 Claims, 10 Drawing Sheets

IMAGE FORMING APPARATUS

BACKGROUND OF THE INVENTION

Field of the Invention

The present invention relates to an image forming apparatus such as a printer, a copier, a facsimile machine, or a multifunctional apparatus.

Description of the Related Art

An image forming apparatus is provided with a fan duct unit that passes air into the image forming apparatus to, for example, collect ozone generated as a result of charging of A photosensitive drum or toner scattering in the apparatus or discharge heat generated as a result of driving of each component to the outside of the apparatus. The fan duct unit includes a fan that generates an airflow and a duct defining a wind path for passing the airflow generated by the fan, and the fan and the duct are integrally formed. The fan duct unit is attached to a frame body of the image forming apparatus.

Typically, the fan is fixed to a frame or the like via a screw. Conventionally, a configuration of a cooling fan for heat dissipation of a plasma display in which an anti-vibration member such as rubber is provided at each of a plurality of screwing positions and the fan and the frame (chassis metal plate) are screwed together with the anti-vibration members therebetween is disclosed in Japanese Patent Laid-Open No. H09-270975. If this is applied to the fan duct unit described above to attach the fan duct unit to the image forming apparatus, transmission of a vibration caused by the operation of the fan from the fan duct unit to the frame body of the image forming apparatus can be suppressed.

However, in the conventional example, the fan needs to be screwed with the anti-vibration members between the fan and the frame at a plurality of screwing positions, and in the case where this configuration is applied to an image forming apparatus, the attachment of the fan duct unit is complicated and time-consuming.

SUMMARY OF THE INVENTION

According to one aspect of the present invention, an image forming apparatus includes a frame configured to support a process member configured to execute part of an image formation process on a recording material, a fan placed on a placement surface of the frame so as to be relatively movable with respect to the frame, a duct fixed to the frame and having a communication port communicating with an air intake port or an air outlet port of the fan, a restriction portion configured to restrict a movable range of the fan, and an elastic member disposed to be nipped by the duct and the fan.

Further features of the present invention will become apparent from the following description of exemplary embodiments with reference to the attached drawings.

DESCRIPTION OF THE EMBODIMENTS

A fan duct unit of the present embodiment will be described below. First, a schematic configuration of an image forming apparatus suitable for using a fan duct unit of the present embodiment will be described with reference to FIG. 1.

Image Forming Apparatus

Figure 1:
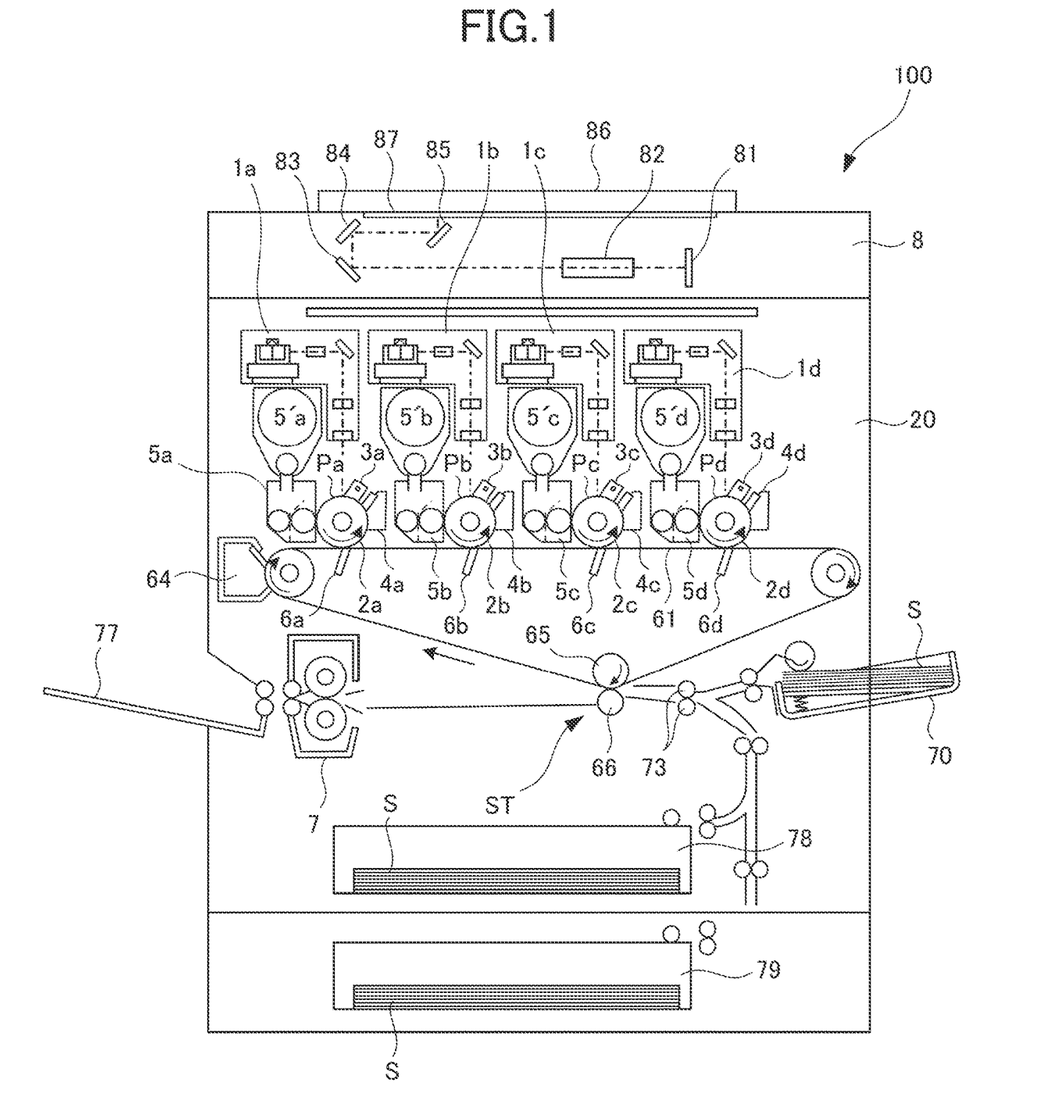
FIG. 1 is a schematic view of an image forming apparatus of a present embodiment.

An image forming apparatus 100 is a full-color printer of an electrophotographic system including four image forming portions Pa, Pb, Pc, and Pd respectively provided in correspondence with four colors of yellow, magenta, cyan, and black. The present embodiment is the image forming apparatus 100 of a tandem type in which the image forming portions Pa, Pb, Pc, and Pd are arranged along a rotation direction of an intermediate transfer belt 61. The image forming apparatus 100 forms a toner image on a recording material S in accordance with an image signal from a document reading apparatus 8 or an unillustrated external device such as a personal computer communicably connected to the image forming apparatus 100. Examples of the recording material S include sheet materials such as paper sheets, plastic films, and cloths.

As illustrated in FIG. 1, the image forming apparatus 100 includes the document reading apparatus 8. The document reading apparatus 8 reads a document placed on a platen glass 87, and includes a line sensor 81, a lens 82, mirrors 83, 84, and 85, and a pressure plate 86. A document placed on the platen glass 87 is pressed by the pressure plate 86. When reading an image of the document, light is emitted onto the document. Reflected light from the document is focused on the line sensor 81 by the lens 82 via the mirrors 85, 84, and 83. The line sensor 81 converts the reflected light from the document into an electric signal. The electric signal is input to an unillustrated controller as image information.

The image forming apparatus 100 includes the plurality of image forming portions Pa, Pb, Pc, and Pd, and each image forming portion performs image formation on the basis of the image signal described above. The unillustrated controller controls exposing units 1a, 1b, 1c, and 1d in accordance with the image information, and thus causes the exposing units 1a to 1d to output laser light modulated in accordance with the image information.

To be noted, the image forming apparatus 100 includes, on the front side thereof, an unillustrated operation portion including a display portion capable of displaying various information, keys via which various information can be input in accordance with a user operation, and the like. In the present specification, the side on which the user stands when operating the operation portion to operate the image forming apparatus 100 will be referred to as a "front side", and the opposite side thereof will be referred to as a "back side". In addition, the left side as viewed from the front side of the image forming apparatus 100 will be referred to as the "left side", and the right side as viewed from the front side will be referred to as the "right side".

The image forming portions Pa, Pb, Pc, and Pd respectively form toner images of corresponding colors. Specifically, the image forming portion Pa forms a yellow (Y) toner image, the image forming portion Pb forms a magenta (M) toner image, the image forming portion Pc forms a cyan (C) toner image, and the image forming portion Pd forms a black (Bk) toner image. Since these image forming portions Pa to Pd have approximately the same configurations, the image forming portion Pa that forms a yellow (Y) toner image will be described as an example, and description of the other image forming portions Pb to Pd will be omitted.

The image forming portion Pa includes a photosensitive drum 2a, a charging unit 3a, an exposing unit 1a, a developing unit 5a, and a drum cleaning unit 4a. In the present embodiment, the photosensitive drum 2a, the charging unit 3a, the exposing unit 1a, and the developing unit 5a correspond to process members for executing part of an image formation process of forming an image on the recording material S.

The charging unit 3a charges the surface of the rotating photosensitive drum 2a to a predetermined potential. The exposing unit 1a is an optical scanning device, irradiates the uniformly charged surface of the photosensitive drum 2a with laser light modulated in accordance with the image information of the corresponding color, and thus forms an electrostatic latent image on the surface of the photosensitive drum 2a. Specifically, the exposing unit 1a includes, for example, a laser driver that turns on and off the laser light emitted from a semiconductor laser, and guides the laser light from the semiconductor laser to the photosensitive drum 2a via a reflection mirror while distributing the laser light in the main scanning direction by a rotary polygonal mirror. As a result of this, an electrostatic latent image corresponding to the image signal is formed on the surface of the photosensitive drum 2a. An irradiation position in the rotation direction with respect to the photosensitive drum 2a, deviation from a generatrix of the photosensitive drum 2a, and a focus are adjusted in advance for the exposing unit 1a by using dedicated tools. The focus adjustment is performed such that the laser light is focused on the surface of the photosensitive drum 2a.

The developing unit 5a develops the electrostatic latent image on the photosensitive drum 2a with a developer (toner) of the corresponding color, and thus forms a toner image. A developer replenishment container 5'a accommodating toner of the corresponding color is replaceably coupled to the developing unit 5a. Toner is supplied from the developer replenishment container 5'a to the developing unit 5a in accordance with consumption of toner.

A primary transfer unit 6a is subjected to application of a primary transfer bias of a polarity opposite to the polarity of the toner, and thus the toner image on the photosensitive drum 2a is transferred onto the intermediate transfer belt 61 through primary transfer. Residual toner remaining on the photosensitive drum 2a after the primary transfer is removed by the drum cleaning unit 4a.

The intermediate transfer belt 61 is an endless belt that is stretched over a plurality of stretching rollers and a secondary transfer inner roller 65, and is moved at a speed corresponding to the rotational speed of the photosensitive drums 2a to 2d by an unillustrated motor or the like. Image formation processes of respective colors performed in parallel by the image forming portions Pa to Pd of respective colors are each performed at such a timing that the toner image formed thereby is superimposed on a toner image of another color transferred onto the intermediate transfer belt 61 on the upstream side in the moving direction through primary transfer. As a result of this, eventually a full-color toner image is formed on the intermediate transfer belt 61, and is conveyed to a secondary transfer portion ST. The secondary transfer portion ST is a nip portion which is formed by the secondary transfer inner roller 65 and a secondary transfer outer roller 66 opposing each other with the intermediate transfer belt 61 therebetween and to which a predetermined pressure and a secondary transfer electric field are applied to transfer the toner image from the intermediate transfer belt 61 onto the recording material S. To be noted, secondary transfer residual toner remaining on the intermediate transfer belt 61 after passing through the secondary transfer portion ST is collected from the intermediate transfer belt 61 by a belt cleaner unit 64.

The recording material S is accommodated in a manual feed tray 70 or a cassette 78 or 79, and the recording material S fed from one of these is conveyed to the secondary transfer portion ST by registration rollers 73 at a timing matching the toner image on the intermediate transfer belt 61. The recording material S bearing the toner image transferred through secondary transfer in the secondary transfer portion ST is conveyed to a fixing unit 7 and is heated and pressurized in the fixing unit 7, and thus the toner image borne on the recording material S is fixed to the recording material S. The recording material S having passed the fixing unit 7 is discharged onto a discharge tray 77.

Frame Body

The image forming apparatus 100 includes a frame body 20 that will be also referred to as a casing or the like. The frame body 20 is constituted by, for example, a bottom plate disposed at a bottom portion, a front side plate disposed on the front side, a back side plate disposed on the back side, a plurality of support frame bodies such as struts interconnecting the front side plate and the back side plate or supporting the front side plate and the back side plate, and the like. The front side plate, the back side plate, and the support frame bodies are formed from, for example, metal plates, and can support the photosensitive drums 2a to 2d, the charging units 3a to 3d, the exposing units 1a to 1d, the developing units 5a to 5d, the drum cleaning units 4a to 4d, the fixing unit 7, and the like described above. In addition, in the present embodiment, a fan duct unit 50 illustrated in FIG. 7 that will be described later is supported by the frame body 20.

Figure 2:
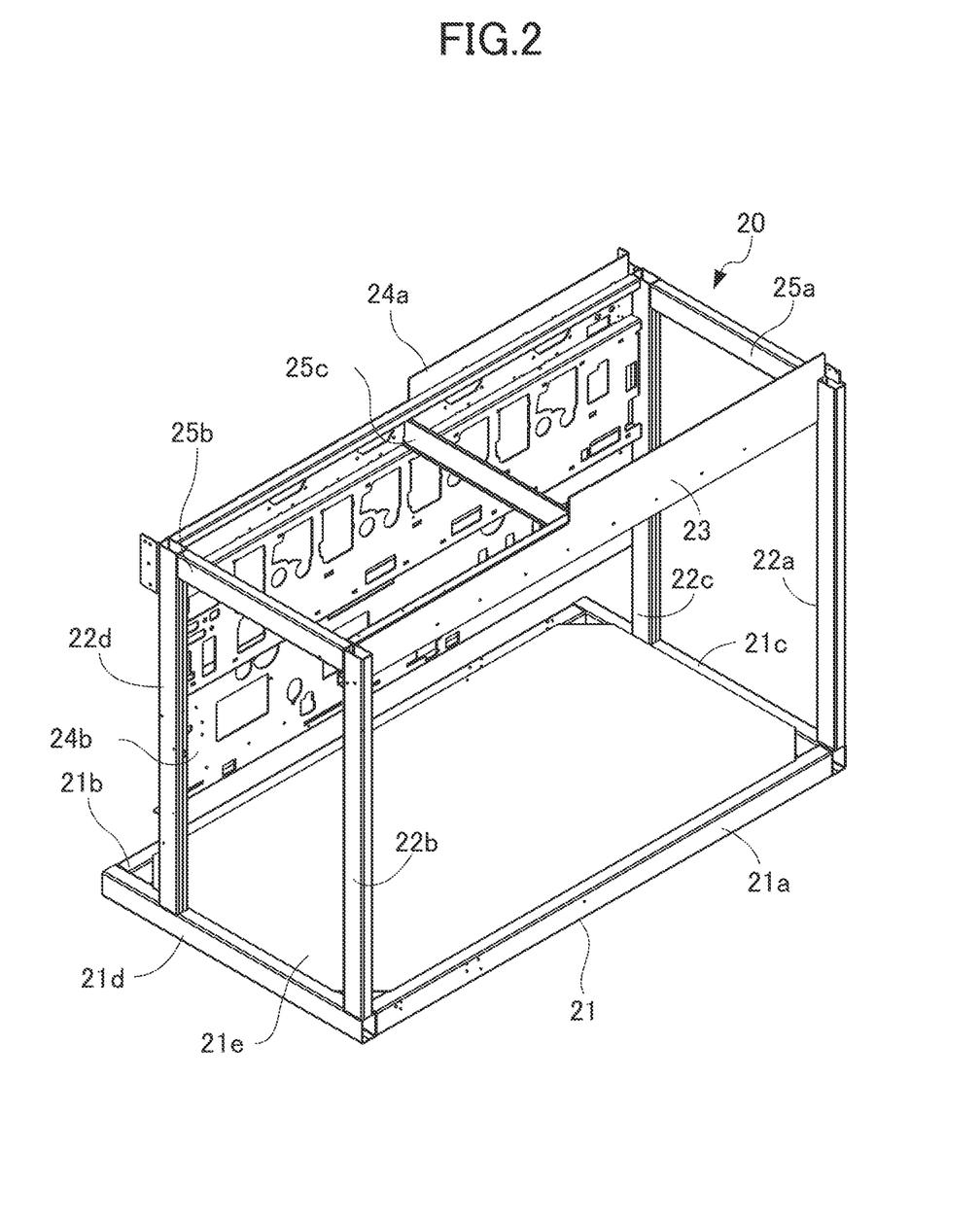
FIG. 2 is a perspective view of a frame body of the image forming apparatus.

The frame body 20 will be described with reference to FIG. 2. As illustrated in FIG. 2, a bottom plate 21 is formed by bonding edge members 21a, 21b, 21c, and 21d and a rectangular flat surface member 21e by welding. To be noted, unillustrated casters that make the image forming apparatus 100 movable may be provided at the four corners of the bottom portion of the bottom plate 21.

On the upper surface of the bottom plate 21, struts 22a and 22b are respectively provided to erect at left and right corners on the front side of the image forming apparatus 100 by welding. A front side plate 23 is bonded to an upper portion of the struts 22a and 22b by welding so as to bridge the struts 22a and 22b. In contrast, on the upper surface of the bottom plate 21, struts 22c and 22d are respectively provided to erect at left and right corners on the back side of the image forming apparatus 100 by welding. Further, back side plates 24a and 24b are bonded to the struts 22c and 22d by welding so as to bridge the struts 22c and 22d. In addition, the back side plates 24a and 24b are bonded together by welding.

A beam member 25a is bonded to an upper portion of the struts 22a and 22c provided on the front side and the back side of the right side of the image forming apparatus 100 by welding, so as to bridge the struts 22a and 22c. In addition, a beam member 25b is bonded to an upper portion of the struts 22b and 22d provided on the front side and the back side of the left side of the image forming apparatus 100 by welding, so as to bridge the struts 22b and 22d. Further, at a center portion of the frame body 20 in the left-right direction, a beam member 25c is bonded to the front side plate 23 and the back side plate 24a by welding so as to bridge the front side plate 23 and the back side plate 24a. The edge members 21a, 21b, 21c, and 21d, the struts 22a, 22b, 22c, and 22d, and the beam members 25a, 25b, and 25c described above are each formed as a hollow prismatic column having a rectangular cross-section, and maintains the stiffness of the frame body 20.

Attachment of Exposing Units

Figure 3A:
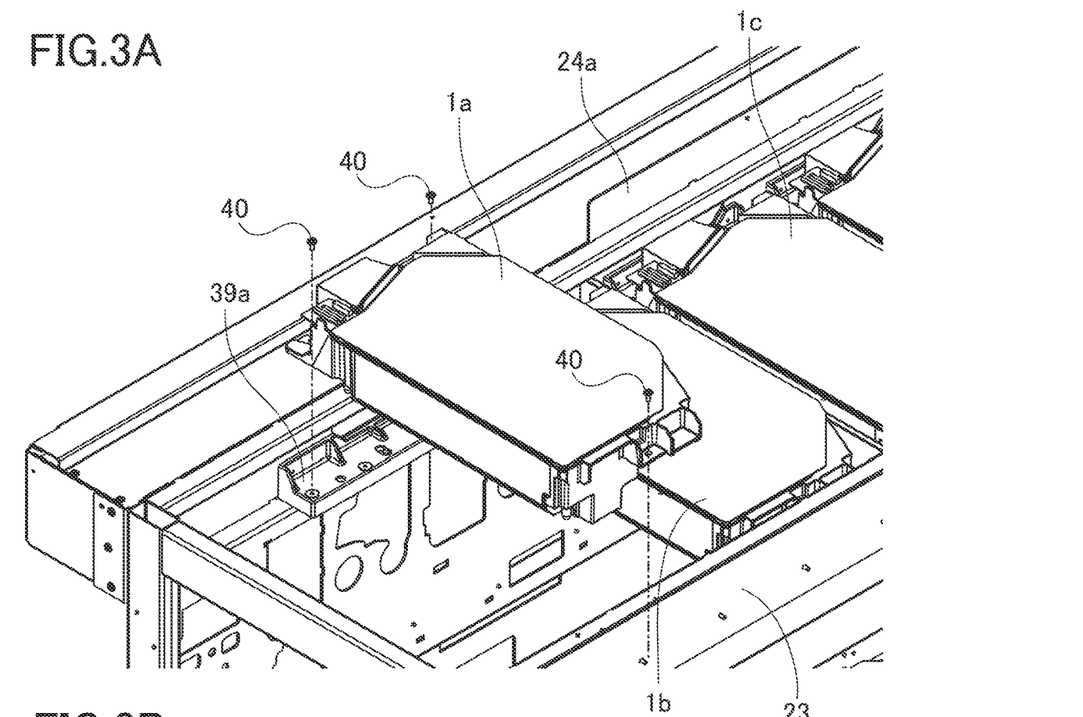
FIG. 3A is a perspective view illustrating how an exposing unit is attached to the frame body as viewed from the front side.
Figure 3B:
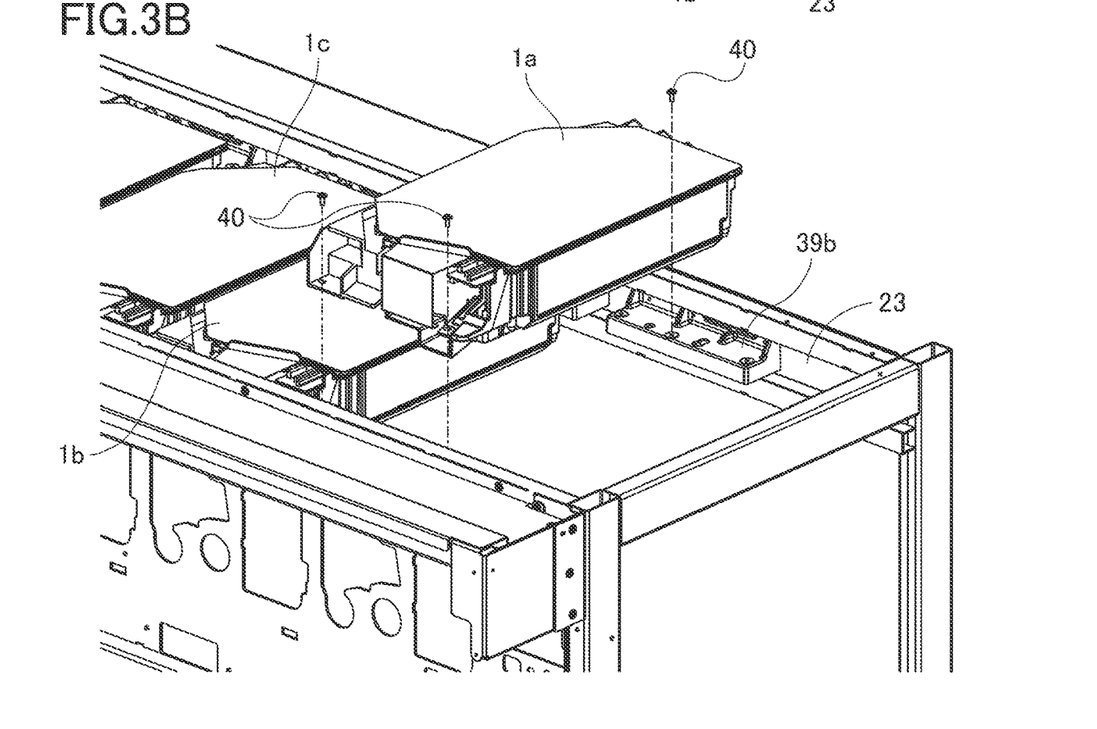
FIG. 3B is a perspective view illustrating how the exposing unit is attached to the frame body as viewed from the back side.

The frame body 20 supports the photosensitive drums 2a to 2d, the charging units 3a to 3d, the exposing units 1a to 1d, the developing units 5a to 5d, the drum cleaning units 4a to 4d, the fixing unit 7, and the like. Therefore, as an example, how the exposing unit 1a is attached to the frame body 20 will be described herein with reference to FIGS. 3A and 3B. FIG. 3A is a perspective view illustrating how the exposing unit 1a is attached to the frame body 20 as viewed from the front side, and FIG. 3B is a perspective view illustrating how the exposing unit 1a is attached to the frame body 20 as viewed from the back side.

As illustrated in FIG. 3A, for example, a holding member 39a formed by die-casting aluminum is attached to the inner side of the back side plate 24a with unillustrated screws. Similarly, as illustrated in FIG. 3B, for example, a holding member 39b formed by die-casting aluminum is attached to the inner side of the front side plate 23 with unillustrated screws at a position opposing the holding member 39a in the front-back direction. The exposing unit 1a is placed on the holding members 39a and 39b provided on the front side and back side, and fixed with screws 40. To be noted, the other exposing units 1b, 1c, and 1d are similarly fixed to the holding members 39a and 39b respectively provided on the front side and the back side.

Fan Duct Unit

Next, a fan duct unit for passing air in the image forming apparatus 100 will be described. In the description below, for easier understanding of the description, an image forming fan duct unit that passes air in the image forming apparatus 100 for exhausting air to the outside without stagnating heat in the frame body while collecting ozone and scattering toner generated in an image formation step will be described as an example. By passing air in the image forming apparatus 100 by the fan duct unit 50, a charging failure such as charging unevenness caused by the ozone or scattering toner attaching to the photosensitive drum or the charging unit, a development failure caused by deterioration of the fluidity of the toner resulting from excessive heating, and the like can be suppressed.

Figure 5A:
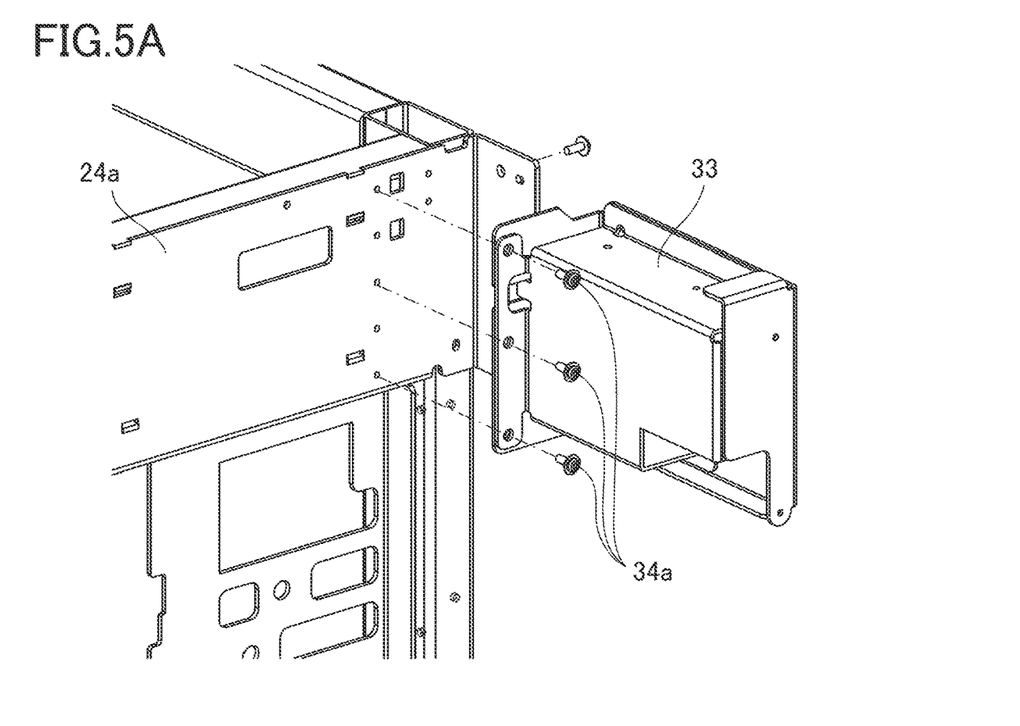
FIG. 5A is a perspective view of a second fixing member of the attachment supporting member as viewed from the obliquely upper-right side.
Figure 5B:
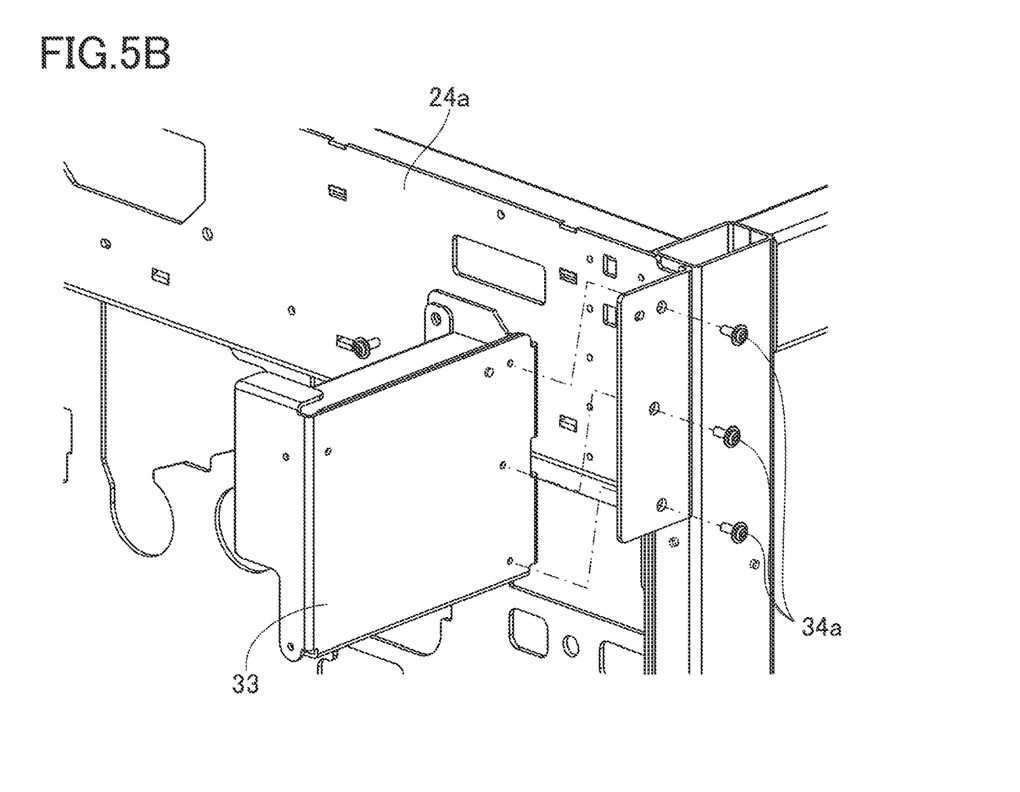
FIG. 5B is a perspective view of the second fixing member of the attachment supporting member as viewed from the obliquely upper-left side.
Figure 6:
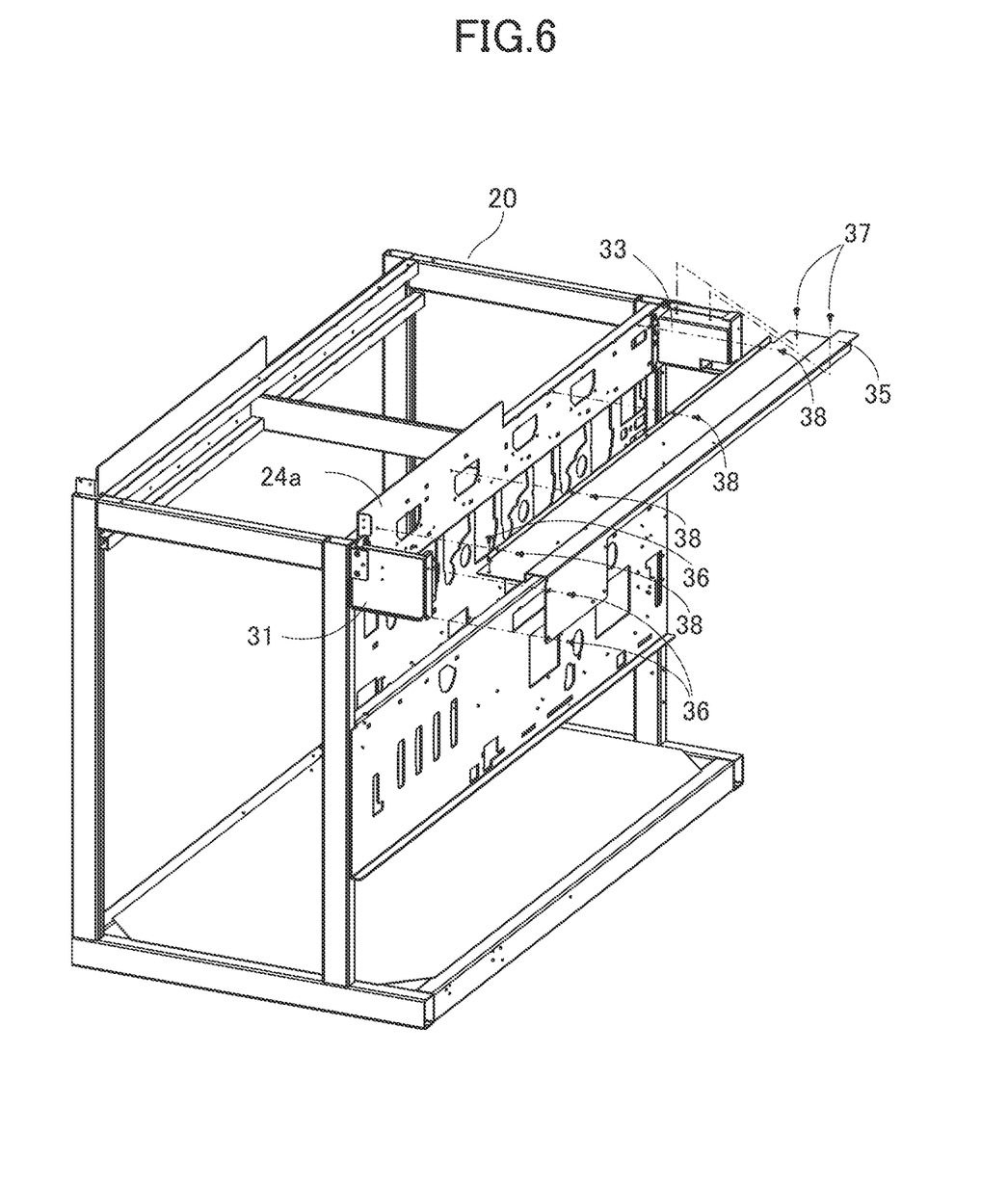
FIG. 6 is a perspective view of a third fixing member of the attachment supporting member.
Figure 7:
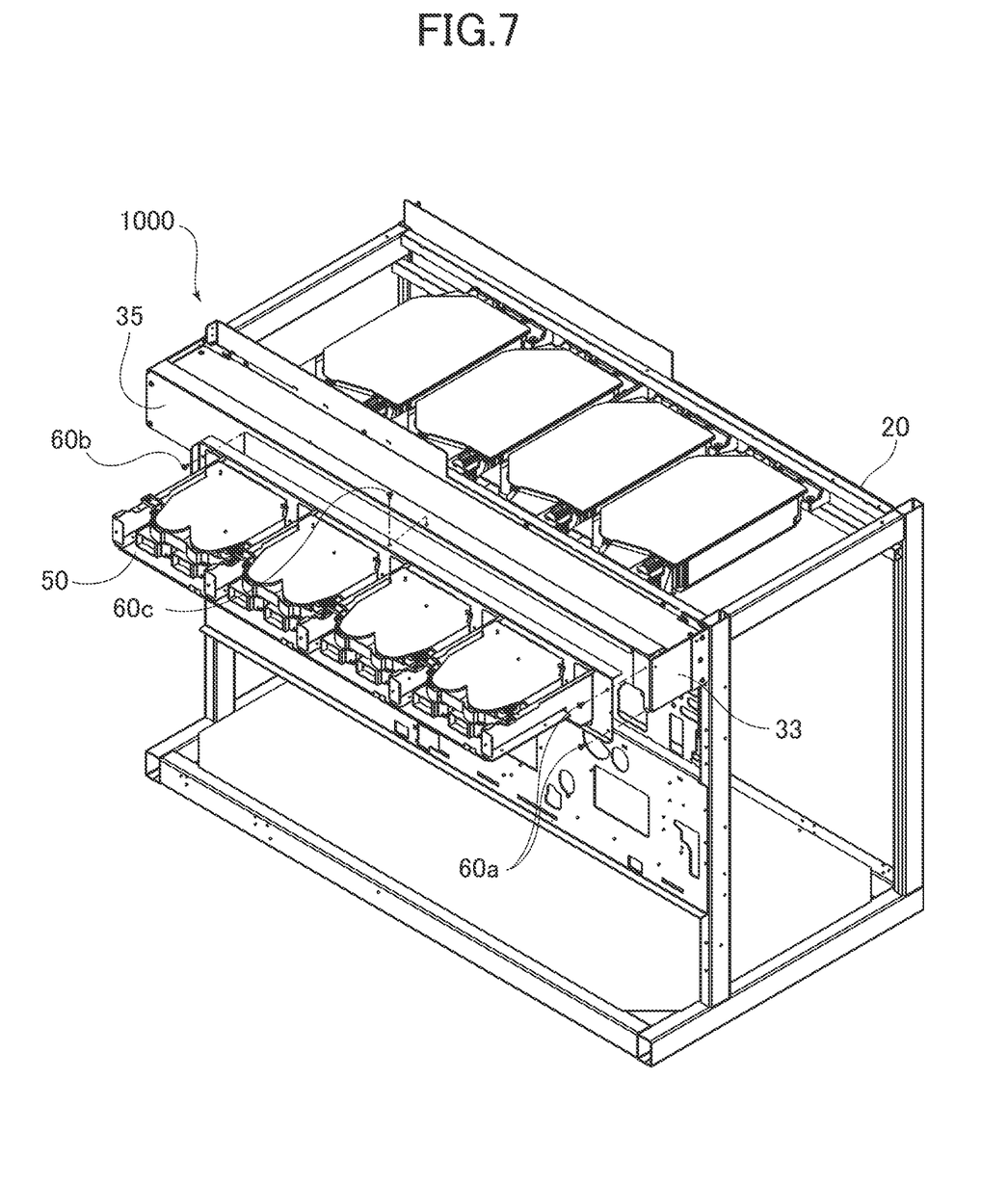
FIG. 7 is a perspective view illustrating how the fan duct unit is attached to the attachment supporting member.

First, elements for supporting the fan duct unit 50 illustrated in FIG. 7 will be described by using FIGS. 4A to 6 with reference to FIG. 2. The fan duct unit 50 is supported by the attachment supporting member (31, 33, and 35) constituting the frame body 20. For example, as illustrated in FIG. 6, the attachment supporting member is constituted by a first fixing member 31, a second fixing member 33, and a third fixing member 35.

Figure 4A:
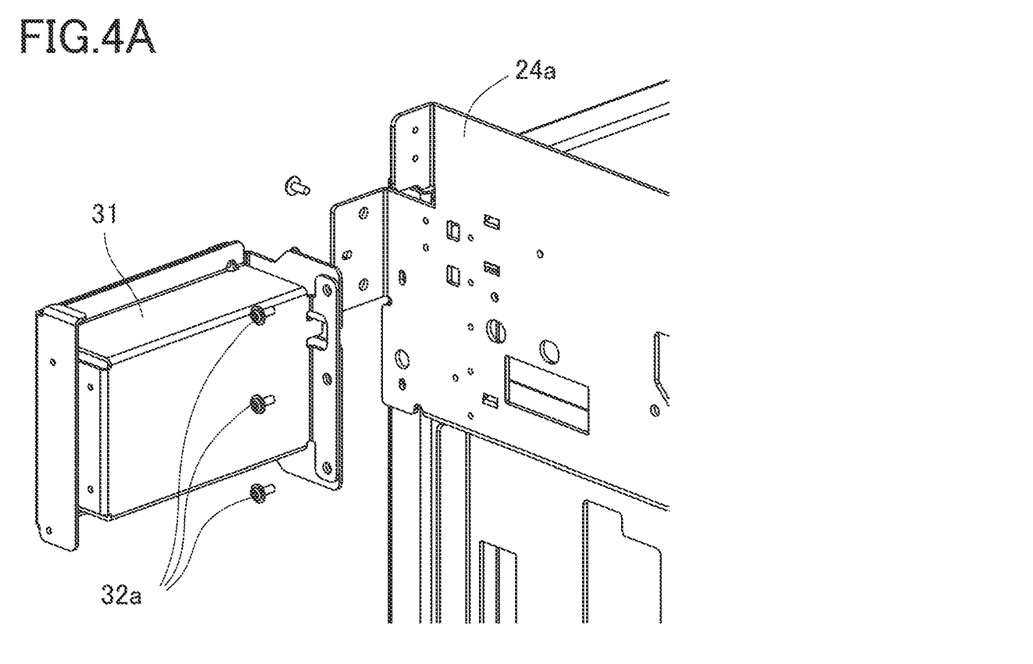
FIG. 4A is a perspective view of a first fixing member of an attachment supporting member for attaching a fan duct unit as viewed from the obliquely upper-left side.
Figure 4B:
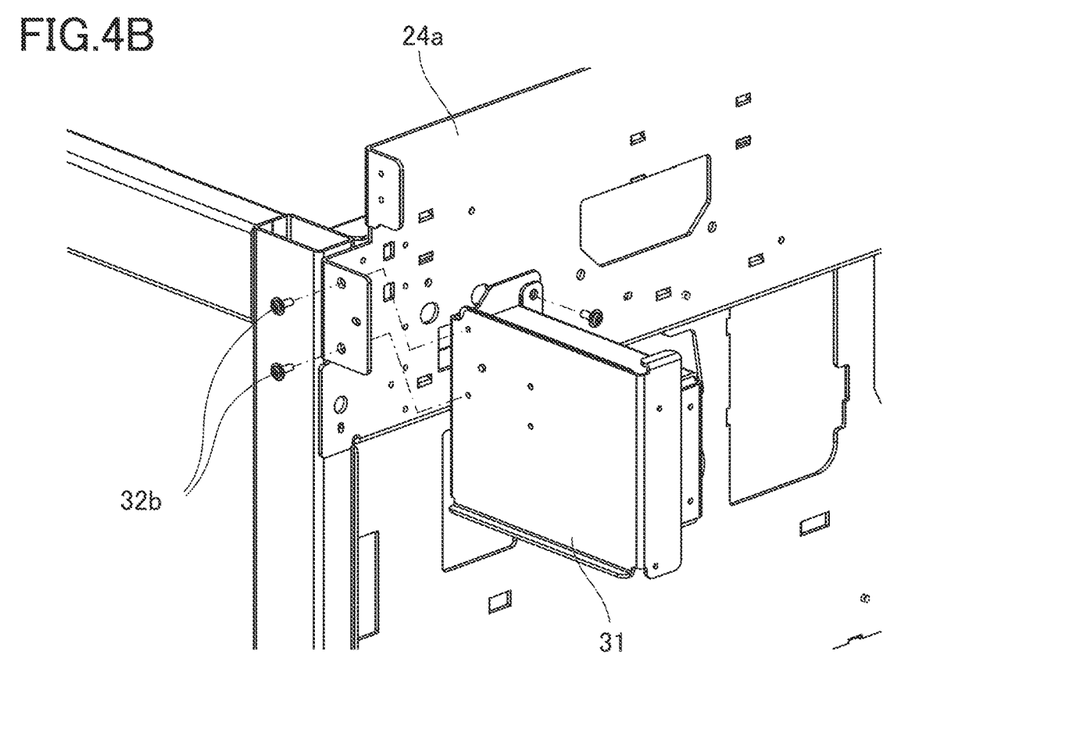
FIG. 4B is a perspective view of the first fixing member of the attachment supporting member for attaching the fan duct unit as viewed from the obliquely upper-right side.

As illustrated in FIGS. 4A and 4B, the first fixing member 31 is fixed to the back side plate 24a with screws 32a from the back side and with screws 32b from the right surface side. As illustrated in FIGS. 5A and 5B, the second fixing member 33 is fixed to the back side plate 24a with screws 34a from the back side and with screws 34b from the left surface side. The first fixing member 31 and the second fixing member 33 are provided at positions opposing each other in the left-right direction. Further, as illustrated in FIG. 6, a third fixing member 35 is provided to bridge the first fixing member 31 and the second fixing member 33, fixed to the first fixing member 31 with screws 36 from the upper side in the vertical direction and the back side in the horizontal direction, and fixed to the second fixing member 33 with screws 37 from the upper side in the vertical direction. Further, the third fixing member 35 is fixed to the back side plate 24a with screws 38 from the back side.

Support of Fan Duct Unit

How the fan duct unit 50 is attached to the attachment supporting member described above will be described with reference to FIG. 7. As illustrated in FIG. 7, the fan duct unit 50 is fixed to the second fixing member 33 at two positions including an upper position and a lower position in the vertical direction with screws 60a at one end in the left-right direction serving as a longitudinal direction, and is fixed to the first fixing member 31 at two positions including an upper position and a lower position in the vertical direction with screws 60b at the other end in the left-right direction. That is, similarly to the screws 60a, the screws 60b fix the fan duct unit 50 at one lower position in the vertical direction in addition to the one position illustrated in the drawings. In addition, the fan duct unit 50 is fixed to the third fixing member 35 with screws 60c from the upper side in the vertical direction at a center portion in the left-right direction. In this manner, the fan duct unit 50 is attached to the attachment supporting member and supported by the frame body 20.

Configuration of Fan Duct Unit

Figure 8:
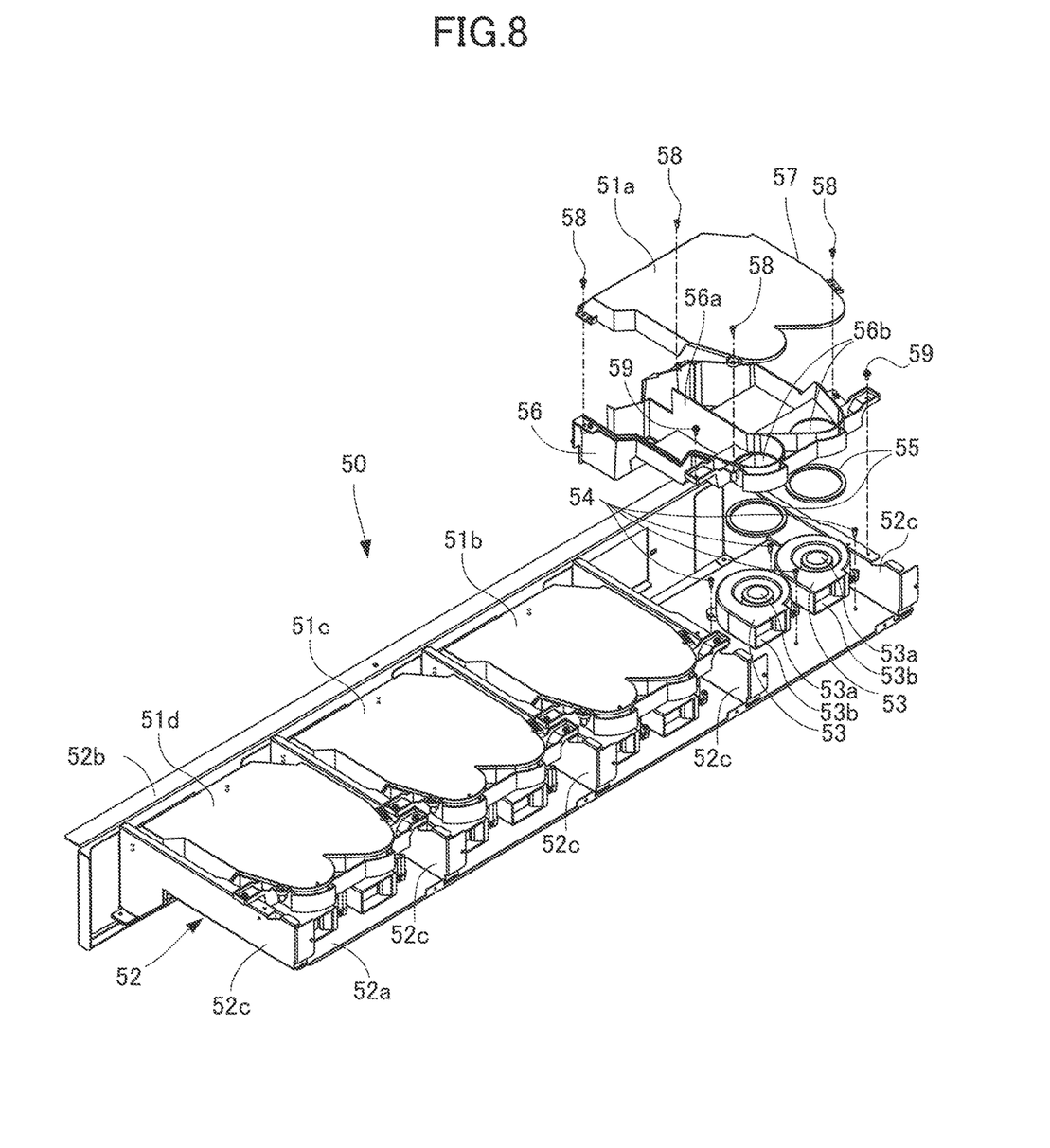
FIG. 8 is a perspective view illustrating a configuration of the fan duct unit.
Figure 9:
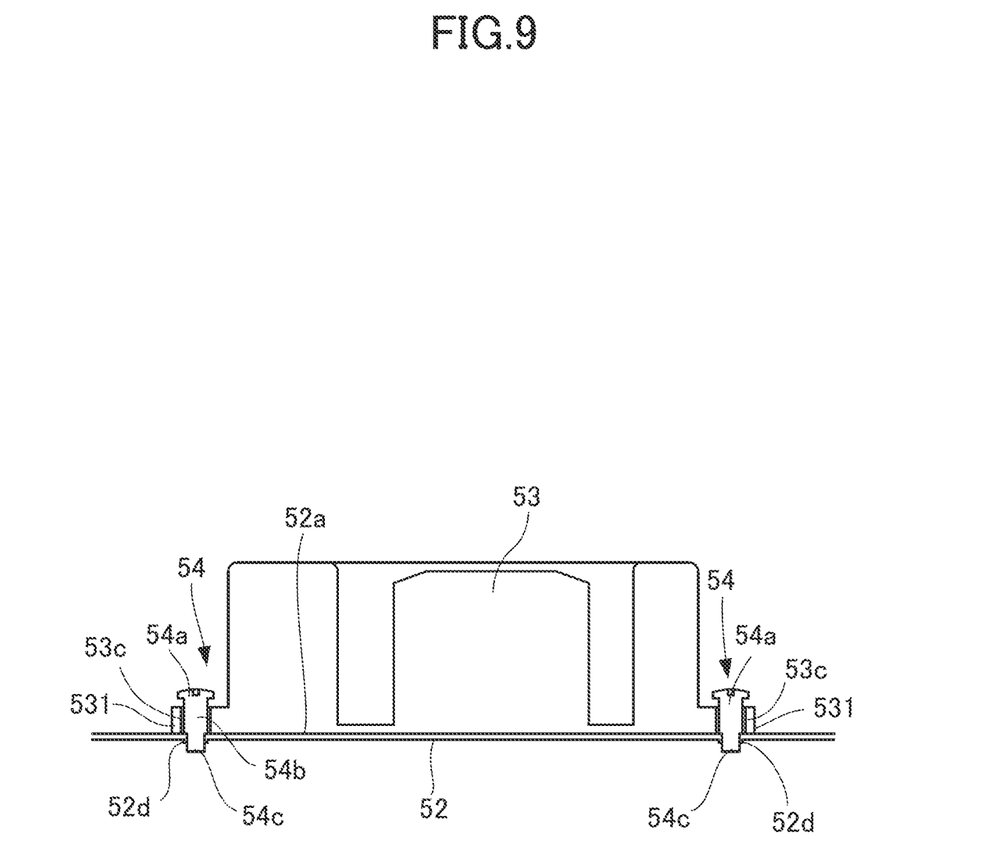
FIG. 9 is a section view illustrating how a fan is attached.

Next, a configuration of the fan duct unit 50 of the present embodiment will be described with reference to FIGS. 8 and 9. FIG. 8 is a perspective view illustrating a configuration of the fan duct unit 50 in a state in which a part thereof is disassembled. FIG. 9 is a section view illustrating how a fan 53 is attached.

As illustrated in FIG. 8, the fan duct unit 50 of the present embodiment includes a frame member 52 and a plurality of duct units 51a, 51b, 51c, and 51d, and a plurality of fans 53. For example, the duct units 51a, 51b, 51c, and 51d are arranged in parallel in the left-right direction on the frame member 52 such that the duct units 51a to 51d communicate with the space in the vicinity of the image forming portions Pa, Pb, Pc, and Pd and air in the image forming apparatus can be exhausted to the outside of the apparatus. The frame member 52 is attached to the attachment supporting member (31, 33, and 35) described above and constitutes part of the frame body 20. In addition, in other words, it can be also said that a frame 1000 including the frame body 20, the attachment supporting member (31, 33, and 35), and the frame member 52 and supporting the process members is configured.

The duct units 51a, 51b, 51c, and 51d have the same configuration, and two fans 53 each for each duct unit are placed on and attached to the placement surface 52a of the frame member 52 by the same attachment method. In the description below, the duct unit 51a will be described as a representative example.

The duct unit 51a includes a duct 56 and a lid portion 57. A partition portion 56a is provided at the center of the duct 56, and two wind paths in which an airflow generated by the two fans 53 are passed are formed. Further, the duct 56 has two communication ports 56b leading to the wind paths, and air passing through each wind path is sucked in from an air intake port 53a of the fan 53 and exhausted to the outside of the image forming apparatus 100 through an air outlet port 53b of the fan 53. In the present embodiment, the fans 53 are each a sirocco fan that sucks in air in a rotation axis direction of blades and exhausts air in the peripheral direction of the blades, and each have the air intake port 53a that is an opening portion opening in the rotation axis direction of the blades rotating along the outer periphery and communicating with a corresponding one of the communication port 56b of the duct 56. The lid portion 57 is fixed to the duct 56 with screws 58 to secure airtightness of the wind paths in the duct 56. The duct unit 51a is fixed to the frame member 52 with screws 59.

To be noted, the fan 53 is not limited to a sirocco fan, and may be an axial fan. In addition, an unillustrated filter member for purifying the air or the like may be provided in the middle of the wind paths in the duct 56. Further, the duct 56 and the lid portion 57 may be integrally formed.

When fixing the duct unit 51a to the frame member 52, a sealing member 55 is provided between the duct 56 and each of the fan 53, and as a result of the fixation of the duct unit 51a with the screws 59, the sealing member 55 is nipped in a compressed state between the communication ports 56b of the duct 56 and the air intake port 53a of the fan 53. The sealing member 55 as an elastic member is formed from an expanded foam of rubber, urethane, or the like, and is formed in an annular shape so as to cover the periphery of the air intake port 53a of the fan 53 and the communication port 56b of the duct 56. A double-sided tape is provided on one surface of the sealing member 55, and the sealing member 55 is stuck on the fan 53 or the duct 56 in advance.

Sealing Member

The sealing member 55 is constituted by an expanded foam material obtained by, for example, foaming synthetic rubber in a semi-closed semi-open state. An expanded foam material of a semi-closed semi-open cell type has a characteristic that the expanded foam material has a small repulsive force and is soft as compared with an expanded foam material of a closed cell type and a non-foam synthetic rubber material. Therefore, the sealing member 55 is likely to easily follow a surface that is displaced due to variations in the component precision or deformation at the time of assembly or a surface that is dynamically displaced in response to vibration, and is thus likely to maintain the adhesion. On the other hand, the expanded foam material of a semi-closed semi-open cell type is inferior to the expanded foam material of a closed cell type and a non-foam synthetic rubber material in airtightness. However, the expanded foam material of a semi-closed semi-open cell type takes a closed cell state by being compressed, and maintains high airtightness equivalent to that of the expanded foam material of a closed cell type or a non-foam synthetic rubber material. Therefore, in the present embodiment, an expanded foam of a semi-closed semi-open cell type is used as the sealing member 55.

The sealing member 55 is compressed and nipped such that the compression amount thereof is "⅕ to ½" of the thickness before compression. This range is set so as to avoid a situation in which the sealing member 55 is compressed so much that it is difficult to displace the front and back surfaces of the sealing member 55 in the shear direction and damping force in the compression direction does not act. In addition, some of the fastening positions of the screws 59 are preferably provided in the vicinity of the fan 53. In this case, the sealing member 55 can have a better function as an anti-vibration member that reduces the vibration of the fan 53 while enhancing the airtightness in the vicinity of the air intake port 53a of the fan 53.

Attaching Method for Fans

The fans 53 are placed on the placement surface 52a of the frame member 52. As illustrated in FIG. 9, the fans 53 each include, on the outer periphery thereof, a plurality of flange portions 531 having insertion holes 53c in which screws 54 are inserted. The screws 54 are each a stepped screw having a head portion 54a, and a shaft portion 54b and a screw portion 54c having different diameters.

The screws 54 are each inserted in an insertion hole 53c provided in a flange portion 531, and are each fixed to the frame member 52 by screwing the screw portion 54c into a screw hole 52d provided in the frame member 52. The flange portions 531 each function as a screwing portion used for screwing the fan 53 by using the screw 54. The screws 54 are each configured such that there is a first gap between the head portion 54a and the flange portion 531 and there is a second gap between the shaft portion 54b and an insertion hole portion defining the insertion hole 53c in the screwed state. As a result of providing the second gap between the shaft portion 54b and the insertion hole portion, the fan 53 is movable in a predetermined direction (including the front-back and left-right directions) along the placement surface 52a. However, the screws 54 serving as restriction portions are capable of restricting the movement of the fan 53 in the predetermined direction. In addition, as a result of providing the first gap between the head portion 54a and the flange portion 531, the fan 53 is movable in the vertical direction. That is, the fan 53 is placed on the placement surface 52a so as to be relatively movable with respect to the frame 1000.

As described above, according to the present embodiment, since the fan 53 is movable on the placement surface 52a in accordance with the gap between the fan 53 and the screws 54, transmission of the vibration of the fan 53 in the rotation direction (predetermined direction along the placement surface 52a) to the exposing unit 1a and the like supported by the frame body 20 can be suppressed. That is, if the fan 53 is completely fixed to the frame member 52 by using normal screws or the like, the vibration of the fan 53, particularly vibration in the predetermined direction along the placement surface 52a can be transmitted to the frame member 52. Further, as a result of transmission of the vibration to the frame member 52, for example, there is a possibility that the transmitted vibration affects the exposing unit 1a supported by the frame body 20. The vibration of the fan 53 being transmitted to the exposing unit 1a can cause an image defect, and is therefore not preferable.

In contrast, in the present embodiment, by allowing a predetermined amount of backlash without providing an anti-vibration member between the fan 53 and the screws 54, transmission of the vibration to the frame member 52 and eventually to the frame body 20 can be suppressed by the reaction force to the displacement in the shear direction between the front and back surfaces of the sealing member 55 even in the case where the fan 53 vibrates in the predetermined direction along the placement surface 52a. In addition, even in the case where the fan 53 vibrates in a direction perpendicular to the placement surface 52a, transmission of the vibration to the duct unit 51a, to the frame member 52, and eventually to the frame body 20 can be suppressed by the damping performance of the sealing member 55 in the compression direction. As described above, since the frame member 52 is less likely to integrally vibrate with the fan 53, the vibration of the fan 53 does not transmit to the exposing unit 1a and the like supported by the frame body 20 even in the case where the fan 53 vibrates.

Further, in the present embodiment, since no anti-vibration member is provided between the fan 53 and the screws 54, the screws 54 do not need to be tightened while fitting an anti-vibration member therebetween when assembling the fan duct unit 50 as in conventional assembly. Therefore, transmission of the vibration generated by the operation of the fan 53 can be suppressed, and the fan duct unit 50 can be easily attached.

Other Embodiments

To be noted, the attachment method of the fans 53 to the frame member 52 is not limited to the attachment with the screws 54 described above. Another attachment method of the fans 53 will be described with reference to FIGS. 10A and 10B. To be noted, in FIGS. 10A and 10B, the same elements as in FIGS. 8 and 9 described above will be denoted by the same reference signs, and the description thereof will be simplified or omitted.

Figure 10A:
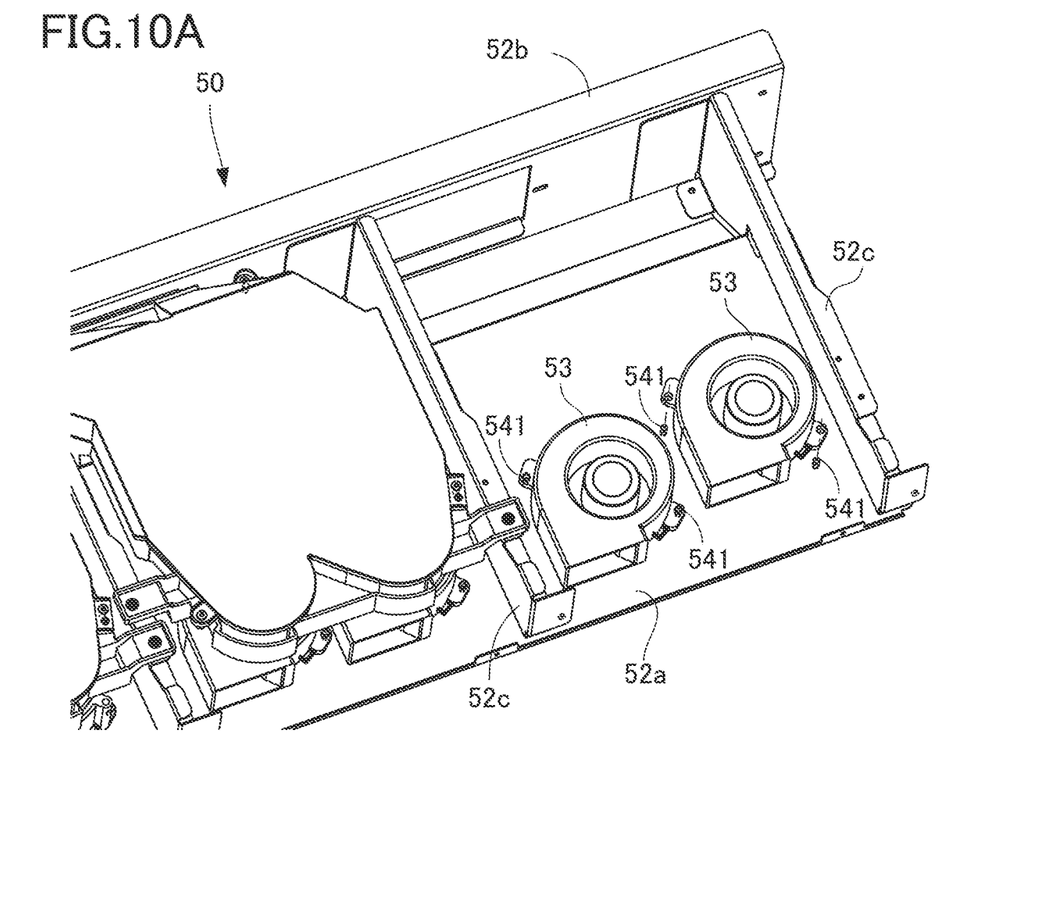
FIG. 10A is a perspective view illustrating another example of how the fan is attached.
Figure 10B:
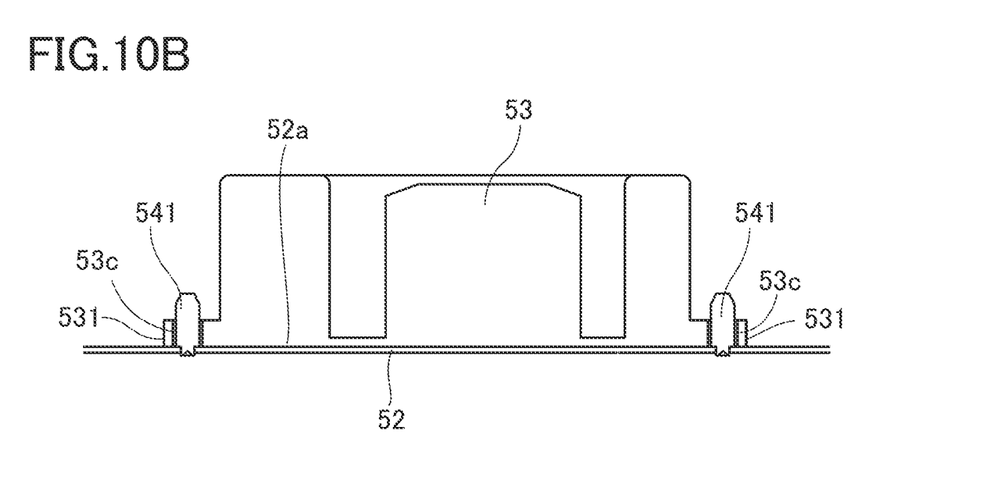
FIG. 10B is a section view illustrating yet another example of how the fan is attached.

As illustrated in FIGS. 10A and 10B, projection portions 541 projecting from the placement surface 52a are provided on the frame member 52. The projection portions 541 are formed at positions matching the insertion holes 53c provided in the flange portions 531 of the fans 53, and the fans 53 are provided with a gap between the projection portions 541 and the insertion hole portions. The projection portions 541 are capable of guiding the fans 53 when placing the fans 53 on the placement surface 52a, and are capable of restricting the movement of the fans 53 in a predetermined direction as restriction portions.

According to the present configuration, the fans 53 are capable of moving in a predetermined direction along the placement surface 52a in accordance with the gap between the insertion hole portions and the projection portions 541. In addition, the fans 53 are movable in the insertion direction of the projection portions 541, that is, a direction perpendicular to the placement surface 52a, and dropping thereof is suppressed by the sealing members 55.

The attachment method for the fans 53 using the projection portions 541 can improve the assemblability of the fan duct unit 50 more than the attachment method for the fans 53 using the screws 54 described above. That is, in the case of using the screws 54, a fastening work needs to be performed when coupling the fans 53 to the frame member 52, but in the case of the projection portions 541, since the projection portions 541 are integrally formed with the frame member 52 in advance, the projection portions 541 just need to be inserted in the fans 53. Then, the duct unit 51 is mounted, and thus the fans 53 are arranged without dropping off from the projection portions 541.

As described above, as a result of arranging the fans 53 while guiding the fans 53 with the projection portions 541 and then urging the fans 53 with the sealing members 55, anti-vibration members do not need to be incorporated in advance, and the fans 53 do not need to be fixed with screws, and therefore the assembly of the fan duct unit 50 can be simplified more.

To be noted, the projection portions 541 are not limited to ones configured to be inserted in the insertion holes 53c provided in the flange portions 531, and for example, the projection portions 541 may be arranged along the outer periphery of the fans 53 with a gap between the projection portions 541 and the outer periphery of the fans 53. In this case, the movement of the fans 53 in the predetermined direction is restricted by contact between the outer periphery of the fans 53 and the projection portions 541 when the fans 53 vibrate and move in the predetermined direction along the placement surface 52a.

To be noted, although the fan duct unit 50 in which the plurality of duct units 51a to 51d are provided on the frame member 52 has been described as an example in the embodiments described above, the configuration is not limited to this, and the fan duct unit may be one including one duct unit. In addition, the fan duct unit is not limited to one in which the air intake ports 53a of the fans 53 communicate with the communication ports 56b of the ducts 56, and may be one in which the air outlet ports 53b of the fans 53 communicate with the communication ports 56b of the ducts 56.

To be noted, the embodiments described above are applicable to not only an image forming fan duct unit but also other fan duct units for passing air in the image forming apparatus. Examples of the other fan duct units include power source fan duct units and fixation fan duct units.

A power source fan duct unit discharges, to the outside of the image forming apparatus, heat generated in a power source that supplies power for operating each component. In accordance with air intake by the power source fan duct unit, outside air for cooling is supplied from the outside of the frame body, and thus the power source can be cooled. As a result of this, operation failure and malfunction of each component caused by deterioration of the output resulting from excessive heating of the power source can be suppressed. The fixation fan duct unit collects volatile organic compounds: VOC, ultra fine particles: UFP, and the like generated in the fixation process, and simultaneously discharges the collected matter to the outside of the frame body without allowing heat and moisture to stagnate in the image forming apparatus. As a result of this, a fixation failure and an operation failure caused by heating of toner, components, and the like resulting from heat stagnating in the image forming apparatus can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-154584, filed Sep. 28, 2022, which is hereby incorporated by reference herein in its entirety

What is claimed is:

1. An image forming apparatus comprising:
   a frame configured to support a process member configured to execute part of an image formation process on a recording material and including a frame member including a placement surface;

a first fan and a second fan each placed on the placement surface of the frame member so as to be relatively movable with respect to the frame member;

a duct removably mounted to the frame member and including a first communication port communicating with an air intake port or an air outlet port of the first fan and a second communication port communicating with an air intake portion or an air output port of the second fan, wherein:

part of the duct is disposed spaced from the placement surface of the frame member;

the first and second fans are disposed between the part of the duct and the placement surface;

the communication port includes a first communication port and a second communication port respectively communicating with the first fan and the second fan; and the duct includes a partition portion providing a first air path and a second air path, in which airflows generated by the first fan and the second fan pass respectively;

a restriction portion configured to restrict a movable range of each of the first and second fans;

a first elastic member disposed between the part of the duct and the first fan; and a second elastic member disposed between the part of the duct and the second fan.

2. The image forming apparatus according to claim 1, wherein each of the first and second elastic members comprises a sealing member configured to seal a gap between one of the first or second communication port of the duct and the respective first or second fan.

3. The image forming apparatus according to claim 2, wherein each of the sealing members is formed from an expanded foam, and is sandwiched between the duct and the respective first or second fan in a compressed state such that a compression amount thereof is ⅕ to ½ of a thickness of the expanded foam before compression.

4. The image forming apparatus according to claim 1, wherein:

the restriction portion includes screws that are screwed into the placement surface, each of the screws includes a head portion, a shaft portion, and a screw portion, each of the first and second fans includes an insertion hole portion defining an insertion hole in which the shaft portion of one of the screws is inserted, and a state where the screw portion is screwed into the placement surface, a first gap exists between the head portion and the insertion hole portion and a second gap exists between the shaft portion and the insertion hole portion.

5. The image forming apparatus according to claim 1, wherein:

the restriction portion includes projection portions projecting from the placement surface, each of the first and second fans includes an insertion hole portion defining an insertion hole through which one of the projection portion is inserted, and in a state where the one of the projection portions is inserted into the insertion hole portion in one of the first or second fan resting on the placement surface, a gap exists between the one of the projection portions and the insertion hole portion in the one of the first or second fan resting on the placement surface.

6. The image forming apparatus according to claim 1, wherein each of the first and second fans is a sirocco fan, and includes an opening portion opening in a rotation axis direction of blades thereof and communicating with the respective first or second communication port of the duct.

7. The image forming apparatus according to claim 1, wherein the process member includes an exposing unit configured to irradiate a charged surface of a photosensitive drum with laser light to form an electrostatic latent image.

8. The image forming apparatus according to claim 1 further comprising:

a fixing screw removably mounting the duct to the frame member, while the part of the duct is disposed spaced from the placement surface, wherein the restriction portion includes screws that are screwed into the placement surface of the frame member.

9. The image forming apparatus according to claim 1, wherein each of the first and second fans is provided outside of the duct so that the respective first or second communication port of the duct communicates with the air intake port or the air outlet port of the respective first or second fan via the respective first or second elastic member.

10. The image forming apparatus according to claim 2, wherein each of the first and second sealing members is sandwiched between the duct and the respective first or second fan in a compressed state.

11. The image forming apparatus according to claim 1, wherein each of the first and second elastic members is disposed on the respective first or second fan and spaced from the placement surface on a side opposite where the respective first or second fan rests on the placement surface.

* * * * *